UNITED STATES PATENT OFFICE 2,222,798

FUGITIVE COLORATION OF TEXTILE MATERIALS

George Holland Ellis and Alexander James Wesson, Spondon, near Derby, England, assignors to Celanese Corporation of America, a corporation of Delaware No Drawing. Application August 3, 1938, Serial No. 222,840. In Great Britain September 23, 1937

4 Claims. (Cl. 8—56)

This invention relates to the fugitive coloration of textile materials.

It is common practice in the textile industry to apply fugitive colorations to textile threads and other materials to assist identification during processing. For instance it is of great advantage to be able to identify particular ends in a warp during weaving and to distinguish at a glance the left-hand twisted crepe threads from the right-hand twisted crepe threads when weaving crepe fabrics. The fugitive colors are removed from the finished material and are preferably such as are readily removed in the course of the scouring operation to which the material is almost invariably subjected prior to dyeing and finishing. For this reason the dyestuffs employed in fugitive tinting, which must not have any substantive affinity for the material, are almost invariably water-soluble and it is very convenient to apply them from aqueous solution, a method which has the advantage of being cheap and simple. In the case of materials of cellulose acetate or other cellulose ester or cellulose ether, however, application of simple aqueous solutions of fugitive dyestuffs followed by drying does not yield satisfactory tints. Only weak, dull colorations are obtained, the dyestuff forming an irregular surface deposit which is easily rubbed off.

It has now been found that the fugitive coloration of textile materials can with advantage be effected by applying thereto fugitive dyestuffs for the materials from aqueous solutions in presence of water-soluble film-forming colloids. For instance, cellulose acetate yarn can be satisfactorily tinted in fugitive colors by applying thereto an aqueous solution of an acid dyestuff and gelatine, and drying. In this way distinctive fugitive colorations can be obtained with fugitive dyestuffs which yield only dull stains or irregular surface deposits when applied as simple aqueous solutions in absence of water-soluble colloids or other assistants.

Various substances can be employed as the water-soluble film-forming colloid, for example water-soluble proteins, e. g. isinglass, gelatine and fish glue, polyvinyl alcohol, water-soluble polymeric carbohydrates, e. g. wheat starch, gum tragacanth and agar-agar, and water-soluble esters and ethers of cellulose and of polyvinyl alcohol, e. g. esters and ethers of degraded cellulose and esters and ethers in which the acid radical or the ether radical contains carboxyl, sulphonic, hydroxyl, or other hydrophilic groups, especially hydroxyethyl cellulose. Sugars also have been found useful, for example glucose and the crude and purified sugars obtainable by saccharifying wood. The expression "water-soluble colloid" includes substances which are soluble in very dilute alkaline solutions, e. g. ammonia solutions.

The invention finds its most valuable application in the fugitive coloration of cellulose ester and ether materials with water-soluble acid dyestuffs; it enables these materials to be colored in a wide range of fugitive tints by means of this class of dye, suitable members of which are as follows:

Kiton Yellow S
Resist Orange 51236
Amaranth B
Supramine Violet R
Erio Cyanine A
Xylene Cyanole F. F.
Erio Glaucine Supra
Acid Green G By using these dyestuffs singly and in combination a wide range of distinctive tints can be produced.

The colloid and the fugitive dye are preferably applied together from the same solution though they may be applied separately. Thus, a solution containing about 0.4% acid dyestuff and from about 1% to about 15% of assistant can be used. Gelatine and glucose, for instance, may conveniently be employed in concentrations of from about 5% to about 10%.

Any convenient method of application of the coloring liquid may be employed. Thus, threads may be colored by simply running them through an aqueous solution of the water-soluble colloid and fugitive dyestuff and drying. The liquid can also be applied to travelling threads by a wick or like furnishing device; for example dry-spun artificial silk can be treated as the thread leaves the spinning cell and before it is wound. Again, packages of yarn can be treated by simple immersion in the coloring liquid and drying.

As indicated above, the invention is of particular value in the fugitive coloration of cellulose acetate and other cellulose ester and cellulose ether materials. For example, cellulose acetate threads intended for conversion into crepe threads can be colored, threads intended for left-hand twisting being given a color distinct from that given to threads for right-hand twisting.

The invention is illustrated but not in any way limited by the following examples:

*Example 1*

A cellulose acetate thread is run through an aqueous bath containing about 0.4% of Kiton Yellow S and about 10% of gelatine, and dried. The yarn is well colored, and the color is easily removed by washing.

*Example 2*

A package of cellulose acetate yarn is immersed in an aqueous bath containing 0.4% of Amaranth B and 10% of glucose, until the package has been fairly evenly impregnated by the bath. It is then dried.

*Example 3*

Dry spun cellulose acetate yarn, immediately after leaving the spinning cell and before being wound, is passed in contact with a wick kept wet with an aqueous solution containing about 0.4% of Acid Green G and 7% of hydroxyethyl cellulose; the tinted yarn is dried and wound.

In any example the dye used may be replaced by another of the water-soluble acid dyes listed above, and the specified colloid by one or more of the other water-soluble film-forming colloids which have been mentioned.

Having described our invention, what we desire to secure by Letters Patent is:

1. Process for the fugitive coloration of textile materials having a basis of cellulose derivatives, which comprises applying to the materials from aqueous solutions water-soluble acid dyestuffs for the materials and a substance selected from the group consisting of gelatine, isinglass and fish-glue in amount about 2-40 times that of the dyestuff.

2. Process for the fugitive coloration of textile materials having a basis of cellulose derivatives, which comprises applying to the materials from aqueous solutions water-soluble acid dyestuffs for the materials and water-soluble gelatin in amount about 2-40 times that of the dyestuff.

3. Process for the fugitive coloration of textile materials having a basis of cellulose acetate, which comprises applying to the materials from aqueous solutions water-soluble acid dyestuffs for the materials and a substance selected from the group consisting of gelatine, isinglass and fish-glue in amount about 2-40 times that of the dyestuff.

4. Process for the fugitive coloration of textile materials having a basis of cellulose acetate, which comprises applying to the materials from aqueous solutions water-soluble acid dyestuffs for the materials and gelatin in amount about 2-40 times that of the dyestuff.

GEORGE HOLLAND ELLIS.
ALEXANDER JAMES WESSON.